Feb. 19, 1952 — J. KLOSTER — 2,586,347
CORN-POPPING MACHINE
Filed March 1, 1946 — 2 SHEETS—SHEET 1

INVENTOR
JOHN KLOSTER
BY Howard P. Fischer
ATTORNEY

Feb. 19, 1952     J. KLOSTER     2,586,347
CORN-POPPING MACHINE

Filed March 1, 1946     2 SHEETS—SHEET 2

INVENTOR
JOHN KLOSTER
BY
ATTORNEY

Patented Feb. 19, 1952

2,586,347

UNITED STATES PATENT OFFICE 2,586,347

CORN-POPPING MACHINE

John Kloster, Minneapolis, Minn.

Application March 1, 1946, Serial No. 651,054

3 Claims. (Cl. 99—238.1)

My invention relates to machines for popping corn and is adapted to have capacity so that the machine may be used for commercial purposes.

A feature resides in providing an agitator for the kernels of corn which may be formed of a half-round material or in flat strip-like form with the bottom surface of the agitator resting against the bottom of the popping kettle. With this form of agitator, the kernels of corn are evenly distributed across the bottom of the kettle and the agitator which is half-round in cross section acts to turn each and every kernel of corn over as the agitator rotates in the kettle and passes under the kernels to turn them from one side to the other and in this manner distributes the heat to all sides of the kernels and thereby securing greater efficiency in the popping of the kernels in the operation of my machine.

It is also a feature to provide a single resilient means extending around the shaft which supports the agitator which normally holds the agitator under spring tension against the bottom of the popping kettle.

A further feature of my invention resides in providing a funnel or tube leading upwardly from the center of the popping kettle which provides a steam release for the popping kettle. A steam release passageway is formed in the tubular cross member which supports the kettle by trunnion bearings formed on the ends of the tubular member. This release passageway for the steam extends past the pinion gears which operate the agitator. The steam coming from the popping kettle carries a certain amount of lubricant from the melted butter or oil used in the popping kettle and this lubricant is automatically carried to the pinion gears as the steam passes from the kettle and up through the steam escape tube.

A further feature resides in counterbalancing the popping kettle by the weight of the steam escape tube and I accomplish this by tapering the tube to make it thicker at the top than at the point of contact or connection with the cross tube which supports the popping kettle.

I also provide a ventilator fan positioned with its intake directly above the steam escape tube and which is adapted to be operated by the same motor which operates the agitator spider in the popping kettle.

A further feature resides in providing depending brackets for supporting the bearings for the popping kettle. One of these brackets is hollow to form a shield for the fan or belt from the motor to the shaft which drives the agitator spider in the popping kettle. The inner cover of the hollow depending bracket is removable to give free access to the operating belt or fan from the motor.

The bearing on one side of the tubular cross bar is split so that when the cover of the depending bracket is removed the hollow cross bar with the popping kettle may be lifted out of the depending brackets which support the same.

A further feature of my corn popping machine resides in providing the corn popping kettle with a jacket made in two pieces which are sealed together with a vacuum between the same to keep the outside of the popping kettle cool. The heating element is embedded in the bottom of the corn popping kettle and is an electrical unit, to provide an even temperature in the popping kettle. The vacuum jacket extends down from the side and over the bottom of the popping kettle to protect the same and to assist in directing the heat from the heating unit into the popping kettle and away from the outside thereof.

A further feature resides in my corn popping machine in providing a supply tank for oil or melted butter which is positioned at the top of the kettle supporting brackets.

Associated with the oil reservoir, I provide a measuring and feeding means leading to the popping kettle so that a predetermined amount of oil can be fed into the popping kettle whenever it is desired.

These features together with other details and objects will be more fully and clearly hereinafter set forth in the drawings forming part of the specification:

Figure 6:
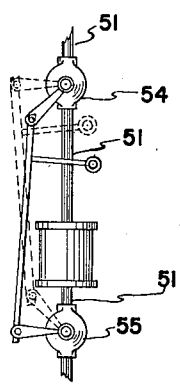

Figure 6 diagrammatically illustrates a side elevation of the oil feeding unit and gauge which measures out a predetermined amount of oil for each popping of the popping kettle.

Figure 1:
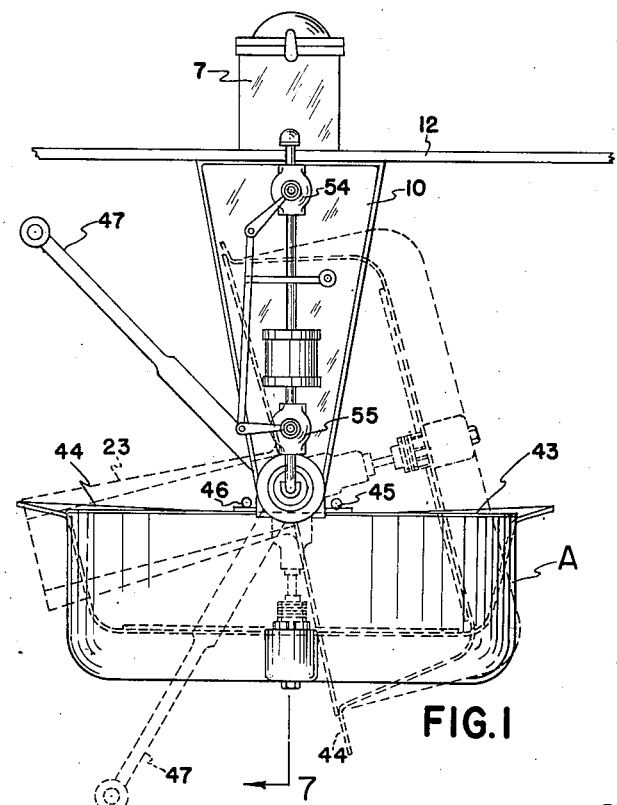
Figure 1 is a side view of a portion of my corn popping machine showing the popping kettle supported from the depending brackets and illustrating in dotted outline the popping kettle in an inclined position to discharge the popped corn from the same.
Figure 7:
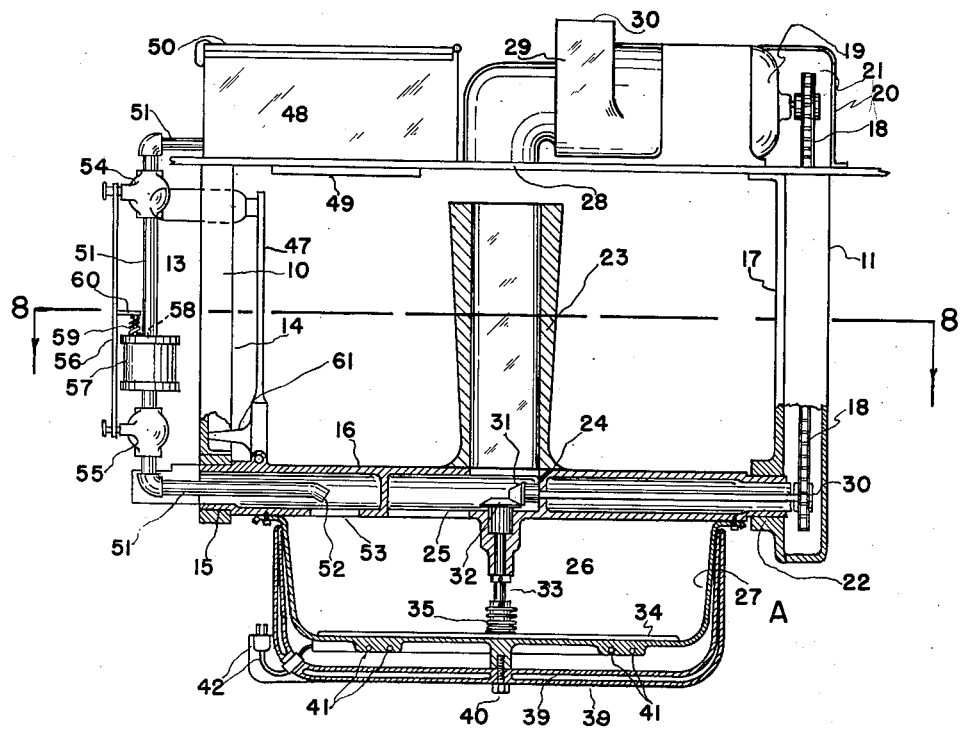

Figure 7 is a vertical section on the line 7—7 of Figure 1.

Figure 8:
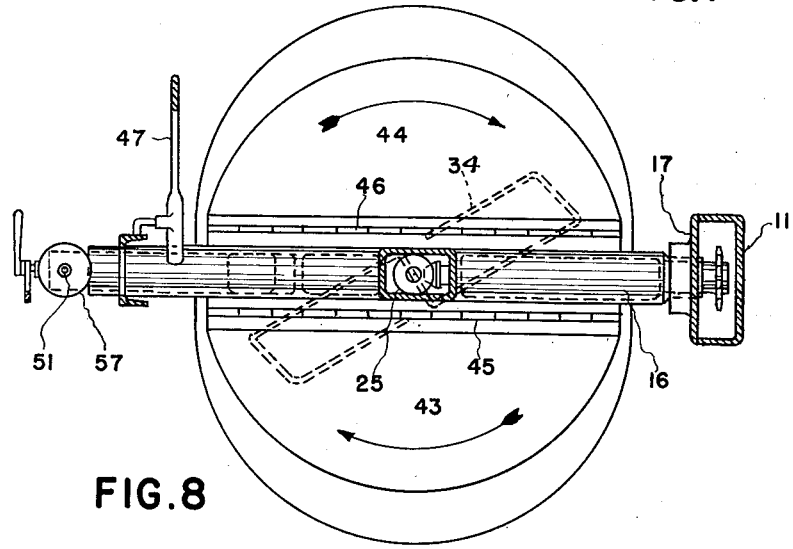

Figure 8 is a horizontal section taken substantially on the line 8—8 of Figure 7 and in the direction of the arrow looking down on the popping kettle.

The drawings illustrate diagrammatically the various essential parts of my corn popping machine which is designed for efficiency as well as capacity in the popping of pop corn. The drawings illustrate a pair of depending supporting brackets 10 and 11 which are secured to the horizontal wall 12 so that the brackets depend from said wall in a manner to support the corn popping kettle unit A.

The bracket 10 is formed with a flush outer face 13 and inwardly extending flanges 14 which reinforce the edges of the bracket. The brackets 10 and 11 are wider at the top than at the bottom to provide strength and regidity to the supporting means, which they provide, for the popping kettle unit A. The bracket 10 is formed with a bearing 15 at the lower end which provides a trunnion bearing for the hollow cross bar 16 which supports the popping kettle unit A.

The bracket 11 is formed hollow and is closed by the inner cover plate 17 which may be removed to give access to the drive belt 18 leading from the driving motor 19. A guard 20 covers the upper end of the drive belt 18 and the sprocket or pulley 21 which drives the same from the motor 19.

The lower end of the bracket 11 is formed with a bearing 22 for the trunnion end of the hollow cross bar 16 which supports the popping kettle unit A. When the plate 17 is removed, the trunnion end of the cross bar 16 may be lifted out of the bearing 22 and in turn the whole popping kettle unit A with its connecting parts may be removed from the brackets 10 and 11.

I provide a counterbalancing funnel steam escape tube 23 which is formed with a feeder at the lower end 24 to connect the same with the hollow cross bar 16. A steam escape passageway 25 is formed in the hollow cross bar 16 leading from the inner chamber 26 of the corn popping kettle 27. This passageway 25 leads into the steam escape tube 23. The top of the steam escape tube 23 is positioned adjacent the intake 28 of the exhaust fan 29 which is operated by the motor 19 to draw the escaping steam from the popping kettle 27 through the tube 23 and into the intake of the exhaust fan 29. This takes care of any exhausting steam ladened with oil from the popping kettle 27.

Figure 2:
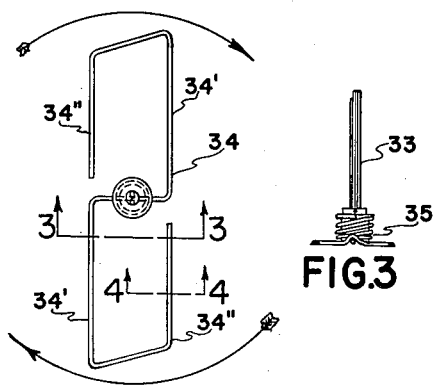
Figure 2 is a diagrammatic plan view of the agitator spider showing the direction of the rotation thereof when in operation.
Figure 3:
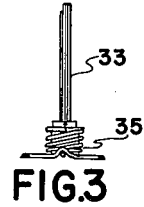
Figure 3 is a section on the line 3—3 of Figure 2 showing the operating shaft for the spider in upright position.

The drive belt 18 is adapted to operate the shaft 30 which extends into the hollow cross bar 16 and which is connected by the pinion 31 with the pinion 32 which is adapted to operate the agitator shaft 33. Thus when the motor 19 is in operation the agitator shaft is rotated to rotate the agitator spider 34 in the direction of the arrows in Figure 2.

Figure 4:
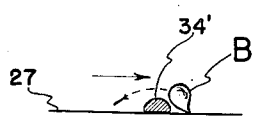
Figure 4 is a section on the line 4—4 of Figure 2 and illustrating a kernel of corn adjacent the cross section of the arm of the agitator spider.

The agitator spider 34 is preferably formed of half-round wire as illustrated in Figure 4 with the flat surface of the wire resting against the bottom of the popping kettle 27.

I provide a coil spring 35 on the lower end of the shaft 33 which is adapted to resiliently support the agitator spider 34 and cause the same to bear slightly under spring tension against the bottom of the popping kettle 27.

The agitator spider 34 is formed with a long leading arm portion 34' on either side of the spider and with a short following arm 34" on the opposite side and virtually parallel in relation to the center of the drive shaft 33. The spider 34 may be formed in any suitable shape and of a single half-round wire member with the connecting portion between the leading arms 34' and the following arms 34" inclined toward the axis of rotation of the spider 34.

Figure 5:
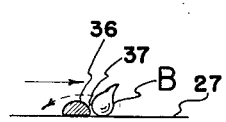
Figure 5 is a similar section to Figure 4 showing the cross sectional shape of the arm of the spider in a flat formation.

The spider 34 may be formed by a flat wire member 36 with beveled edges 37 as illustrated in Figure 5.

The diagrammatic illustrations in Figures 4 and 5 illustrate the unpopped kernels of corn B adjacent the edge of the spider ready to be lifted over the respective bars 34' and the bar 36 and turning the kernels B completely over as the agitator spider revolves in the popping kettle 27. This is a very important feature of my corn popping machine because it is obvious that to obtain efficiency in popping corn it is necessary to rotate the unpopped kernels from side to side to evenly distribute the heat to the kernels and to prevent burning of the same on one side. Thus I am able to get, I believe, the greatest efficiency in the popping of the kernels of corn by my machine.

The popping kettle unit A includes the inner kettle portion 27 which is surrounded over the sides and the bottom by a vacuum jacket 38 having a vacuum space 39 between the sides of the jacket 38. Thus the jacket 38 acts as a sealing means to keep the outside of the popping unit A cool and to retain the heat in the bottom and up the sides of the kettle 27. The kettle jacket 38 is supported by a bolt 40 in the bottom of the popping kettle 27, thus the jacket 38 may be removed when desired.

Built into the bottom of the kettle 27, I provide the electric heating unit 41 which extends around the bottom of the kettle 27 and provides the heating element for the popping kettle. The electrical plug connection 42 is connected to the heating element 41 with any source of electrical energy, not illustrated in the drawings.

The top of the popping kettle 27 is formed with hinged covers 43 and 44 which are hinged at 45 and 46 respectively. The hinges 45 and 46 extend along the side of the hollow supporting member 16. These covers 43 and 44 give access to the popping kettle when desired and when the kernels of corn have been fully popped the popping unit A may be rotated on the trunnion ends of the supporting member 16 in the bearings 15 and 22.

I provide a handle 47 for the operator of my corn popping machine so that when this handle is engaged the popping unit A may be rotated into the position illustrated in dotted outline in Figure 1 whereupon the hinged door 44 will automatically swing into open position permitting the popped corn to be discharged from the kettle 27.

The weighted tube 23 forms a counterbalancing means for the popping unit A to permit the operator to freely rotate the popping unit A into discharging position and counterbalancing the movement of the unit A back into normal position.

I provide a reservoir 48 for oil or melted butter which may be provided with the heating unit 49 on the bottom of the same. The reservoir 48 is located on the horizontal wall 12. The reservoir may be provided with a cover 50 to give access into the same. Leading from the reservoir 48, I provide a pipe means 51 which has a discharge opening 52 above the opening 53 in the supporting member 16. This discharge opening 53 permits oil or melted butter to be discharged into the popping kettle 27. In the piping means 51 I provide a pair of valves 54 and 55 which are spaced apart as illustrated in Figures 1, 6 and 7. The operating levers of the respective valves 54 and 55 are connected by the rod 56. Thus when the rod 56 is moved to open the valve 55 the valve 54 is automatically closed and when the rod 56 is moved to close the valve 55 the valve 54 is opened.

Between the valves 54 and 55 in the piping means 51, I provide a gauge cup 57. This cup 57 is adapted to be emptied when the valve 55 is opened and filled when the valve 55 is closed and the valve 54 is automatically opened.

It is apparent that the valves 54 and 55 may be set so that when the lever 56 is operated to open the valve 55 the valve 54 is fully closed.

I provide an air vent 58 which is normally closed by spring 59 and which is adapted to be opened by a lever 60 connected to the lever 56. This air vent 58 permits the cup 57 to be drained quickly out of the opening 52 into the popping kettle 27.

I have illustrated the principal parts of my corn popping machine in the drawings; however, portions thereof have been illustrated diagrammatically to illustrate the manner in which the respective parts operate; such as the arms of the agitator 34 as shown in Figures 4 and 5. These figures illustrate the agitator bar or arm in relation to a kernel of corn and show the manner in which the kernels engage against the edge of the agitator arm and are caused to be lifted from the bottom of the popping kettle 27 and rolled over the bar depositing the kernels on the other side of the bar. This movement of the agitator is of primary importance because it is essential that the kernels B be continuously rotated during the popping operation; otherwise, the heat in the kettle 27 will be inclined to scorch or burn the kernels and they will not pop. With my agitator which scrapes along the bottom of the popping kettle 27, the kernels of pop corn are engaged and caused to roll over the arms of the agitator and in rolling over these arms the kernels are rotated in the poping kettle causing even distribution of heat against the kernels which virtually insures the popping of the kernels.

My corn popping machine operates rapidly for each popping operation. The ventilating means which I have provided for my corn popping machine carries away the surplus moisture and oil and at the same time lubricates the gears 31 and 32. The ventilating tube 23 forms a means of ventilation for the popping kettle 27 and also acts as a counterbalancing weight to permit the popping unit A to be easily operated and to discharge the popped corn and permit the unit to return to normal position.

I also provide a simplified form of machine, making all the parts freely accessible so that they may be readily replaced when desired.

In operation my corn popping machine supports the popping unit A in a horizontal position pivoted on trunnions formed on the ends of the hollow supporting member 16. The motor 19 drives the shaft 30 to rotate the shaft 33 through the gears 31 and 32 and in turn rotating the agitator spider 34. When the kernels of corn in the popping kettle 27 are fully popped, the hand lever 47 is engaged to move the popping unit A into the dotted position illustrated in Figure 1. When the handle is released, the popping unit A will return to normal horizontal position and is held in this position by the engagement of the lug 61 against the lower end of the bracket 10. The lug 61 is formed integral with the handle lever 47 and projects from the side of the lever. The lower end of the lever is rigidly connected to the hollow cross member 16. Thus when the handle is engaged the entire popping unit A is rotated on the trunnion ends of the hollow cross member 16.

The simplicity of the design of my corn popping machine provides a device which will not easily get out of order and which may be used commercially to pop a large amount of pop corn in a short space of time.

It will be apparent that the drawings illustrate one form of my corn popping machine and various changes may be made in the form and arrangement of these parts without departing from the scope of my invention.

I claim:

1. An agitator for corn popping machines, comprising a spider-like wire agitator, looped ends formed in said agitator with parallelly disposed arm portions, one of said arm portions being longer than the other and said longer arm portion leading said shorter arm portion in the rotation of said spider in the popping kettle of a corn popping machine and a flat bottom surface and a half round top surface formed on the arms of said agitator which is adapted to bear against the inner surface of the bottom of the popping kettle while the thickness of the arms of said agitator acts to raise the kernels of pop corn away from the heated surface of the kettle and to rotate the kernels as the agitator passes under the same to evenly heat all sides of each kernel of pop corn.

2. A corn popping machine comprising, a horizontal hollow supporting member, trunnion ends formed on said member, depending brackets for said trunnion ends, a corn popping kettle unit supported from said hollow member, said corn popping unit including a corn popping kettle, hinged covers for said kettle and a vacuum jacket around the bottom and sides of said kettle, a lever for rotating said popping unit to discharge popped corn out of the same, an air ventilating tube leading axially from said kettle above said supporting member and secured thereto to exhaust oil ladened steam from said popping kettle, an exhaust fan and intake means located above the normal position of said air ventilating tube, a kernel agitator in said kettle and a motor for operating said exhaust fan and said agitator.

3. An agitator in combination with a popping kettle for pop corn machines including, a pair of loops formed on the rotating ends of said agitator, said loops comprising long and short arm portions formed from a single piece of wire and having a semi-circular cross sectional shape through the length of said loops and means for rotating said spider agitator with the flat surface thereof bearing against the bottom of said popping kettle and rotating the same in a direction with the long arm of each loop leading the shorter arm and the arms of said loop acting to lift all the kernels of pop corn off the bottom of the popping kettle and rotate the kernels to heat all sides of the same evenly until each kernel is popped.

JOHN KLOSTER.

(References on following page)

REFERENCES CITED

The following references are of record in the file of this patent:

UNITED STATES PATENTS

| Number | Name | Date |
|---|---|---|
| 294,327 | Nobes | Feb. 26, 1884 |
| 922,363 | Van Wye | May 18, 1909 |
| 998,681 | Ealey | July 25, 1911 |
| 1,206,693 | Gillitt | Nov. 28, 1916 |
| 1,284,109 | Hunt | Nov. 5, 1918 |
| 1,501,168 | Isenhour | July 15, 1924 |
| 1,978,173 | Spier | Oct. 23, 1934 |
| 2,017,293 | Priest | Oct. 15, 1935 |
| 2,147,478 | Barnard | Feb. 14, 1939 |
| 2,232,954 | Manley | Feb. 25, 1941 |
| 2,248,812 | Cretors | July 8, 1941 |
| 2,316,989 | Scott | Apr. 26, 1943 |